KRAMER & BURGER.
Street Lamp.

No. 96,707. Patented Nov. 9, 1869.

WITNESSES:

INVENTORS:

United States Patent Office.

J. H. KRAMER AND ALOIS BURGER, OF NEW YORK, N. Y.

Letters Patent No. 96,707, dated November 9, 1869.

STREET-LAMP.

The Schedule referred to in these Letters Patent and making part of the same.

*To all whom it may concern:*

Be it known that we, J. H. KRAMER and ALOIS BURGER, of the city, county, and State of New York, have invented a new and useful Improvement in Street-Lamps; and we do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
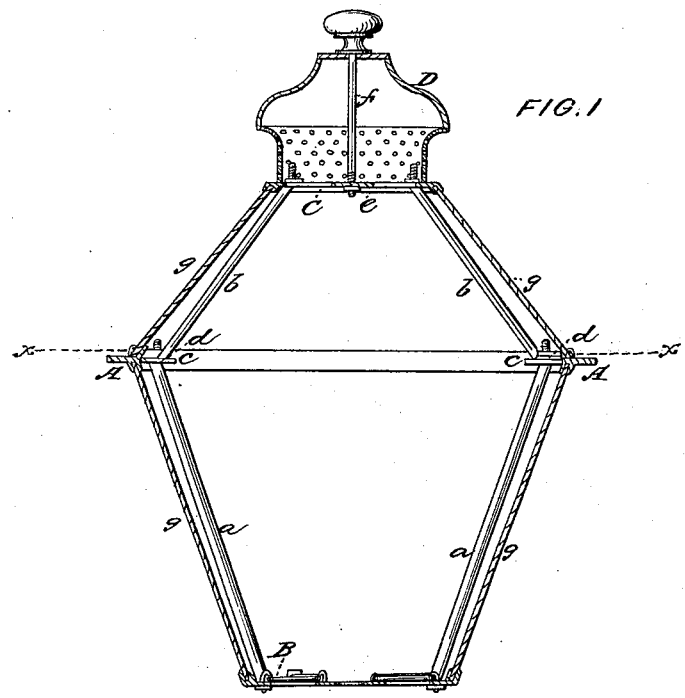
Figure 1 represents a vertical central section of this invention.
Figure 2:
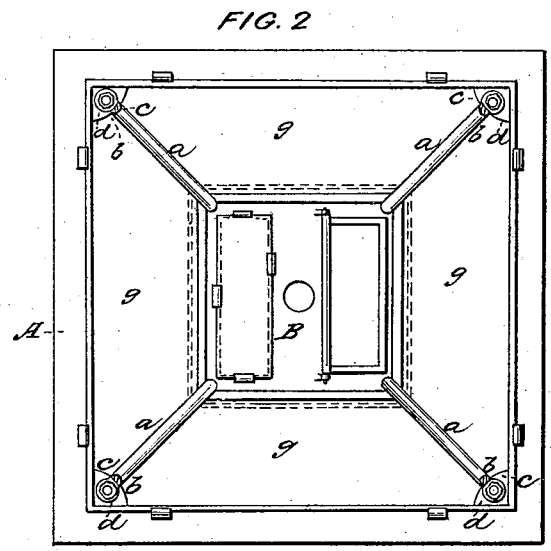
Figure 2 is a horizontal section of the same, the line $x\,x$, fig. 1, indicating the plane of section.

This invention relates to a street-lamp, which is composed of three frames, connected together by screw-rods, and of a cap, which is fastened to the top frame by a central screw, in such a manner that the lamp can be readily taken apart, and packed up in a small compass; and, furthermore, the construction of the lamp is simplified, and its durability is materially increased.

In the drawing—

The letter A designates the central frame of our lamp, which may be made square, polygonal, or of any desired form or shape.

This central frame connects, by means of rods $a$, with the bottom frame B, and, by means of rods $b$, with the top frame C.

The rods $a$ are provided with screws and nuts at both ends, and their upper ends pass through flanges $c$, secured in the corners of the central frame A, and through eyes $d$, formed at the bottom ends of the rods $b$, so that one and the same nut serves to connect one of the rods $a$ and one of the rods $b$ to the central frame.

The upper ends of the rods $b$ are provided with screws and nuts, and said ends pass through flanges, secured in the corners of the top frame, as shown in fig. 1.

By this arrangement of the rods $a$ and $b$, the three frames A B C can be readily secured together.

The top frame C is provided with a central eye, $e$, to admit the screw-bolt $f$, which serves to fasten the cap D in its position. By removing this screw-bolt, the cap can be readily taken off.

The frames A, B, and C, are provided with grooves or guides, to receive the glass panes $g$, which are inserted after the several parts of the lantern have been fastened together.

By these means a lamp is obtained, which can be made very cheap, and all the parts of which can be readily disconnected, so that the lamp can be packed up in a comparatively small space.

The frames A, B, and C, and the cap D, can be cast of iron, or other metal, and the construction of the lamp is thereby materially simplified.

What I claim as new, and desire to secure by Letters Patent, is—

A street-lamp, composed of three frames A, B, and C, which are fastened together by screw-rods $a\,b$, substantially as shown and described.

Also, the arrangement of a central bolt, $f$, passing through the cap D, in combination with the top frame C, as set forth.

J. H. KRAMER.
A. BURGER.

Witnesses:
W. HAUFF,
E. F. KASTENHUBER.